United States Patent [19]
Tracy

[11] 3,951,486
[45] Apr. 20, 1976

[54] ORGANIZER FILE AND BRIEFCASE-DESK COMBINATION FOR VEHICLES

[75] Inventor: Charles W. Tracy, Tallahassee, Fla.

[73] Assignee: Apollo Plastics, Inc., Tallahassee, Fla.

[22] Filed: June 3, 1974

[21] Appl. No.: 476,004

[52] U.S. Cl. .................... 312/235 R; 150/52 R; 190/48; 220/18; 224/42.46 B; 312/245
[51] Int. Cl.² .................................... B60R 7/04
[58] Field of Search ........ 224/29 D, 42.01, 42.42 R, 224/42.42 A, 42.45 R, 42.45 A, 42.46 R, 42.46 B; 220/18; 248/224; 190/9–11; 312/235 R, 235 A, 245

[56] References Cited
UNITED STATES PATENTS

| | | | |
|---|---|---|---|
| 837,000 | 11/1906 | Sibley | 312/245 |
| 2,184,047 | 12/1939 | King | 312/235 R |
| 2,645,547 | 7/1953 | Channer | 312/245 |
| 3,031,242 | 4/1962 | Sawle | 312/235 A X |

Primary Examiner—Robert G. Sheridan
Attorney, Agent, or Firm—Jones, Tullar & Cooper

[57] ABSTRACT

An organizer file for use in vehicles and having a detachable briefcase is disclosed. The organizer file has a plurality of vertically disposed pockets mounted on backing and adapted to receive various articles and papers which are often loosely stored in a vehicle such as an automobile. Suitable hangers are adjustably attached to the file backing for securing the file to a vehicle seat back. Hook means secured to the lower end of the backing are adapted to receive corresponding eyes mounted on a briefcase-desk for releasably securing the briefcase to the backing. The briefcase incorporates a conventional handle and has a latched cover which opens from the end of the case opposite the eyes to permit access to the interior thereof when the briefcase is attached to the file. The top of the briefcase is flat to form a desk surface and incorporates a clip for securing papers. When secured together the file and the briefcase cooperate to form a desk assembly adapted to be secured to a vehicle seat, the briefcase being easily detachable for convenient carrying of papers and other material.

16 Claims, 7 Drawing Figures

ORGANIZER FILE AND BRIEFCASE-DESK COMBINATION FOR VEHICLES

BACKGROUND OF THE INVENTION

The present invention relates, in general, to storage devices for use in vehicles such as automobiles, and more particularly to a device for storing, filing and securing in an orderly manner papers, books, flashlights, eyeglasses and like small articles within easy reach of a driver or passenger in the vehicle. The invention further relates to such a device which incorporates a detachable briefcase that also serves as a desk for use in the vehicle.

As a necessary adjunct to their job, many people today spend a large portion of their working hours riding in or driving automobiles, trucks, and other vehicles. Salesmen, business representatives and executives, for example, may spend a substantial part of their time traveling from one place of business to another, attending meetings, calling on customers, and the like, while other persons, such as taxi drivers, police officers, and delivery truck drivers, may conduct substantially all of their business in or from the vehicle itself. Such people tend to accumulate in their vehicles the papers and paraphenalia of their business, and since the conventionally provided storage areas such as glove compartments are generally small and inconveniently placed, such material accumulates on the seats, dashboard and floor of the vehicle. Such accumulations can create a real danger to the driver and passengers in the vehicle in the case of sudden stops or turns, in addition to being unsightly and inconvenient. Further, papers and other articles strewn about the vehicle are difficult to locate, often sliding out of reach when the vehicle is in motion, and this results in lost time when the material is to be located, and can divert the driver's attention from the road. Accordingly, there has long been a need for a convenient, easy to reach storage device for use in vehicles which would provide room for organized storage of the papers and other articles often carried in vehicles. Such a storage device must be securely mounted so as to avoid danger, must be conveniently located to the driver or passenger, should be easily removable, and should provide storage facilities for a variety of differently sized and shaped articles.

A difficulty often encountered by those who work in or from their vehicles is the lack of a suitable writing surface, and the lack of some means for carrying and storing personal items, papers, records and the like which are not to be left in the vehicle. Although desks and writing tables of various designs have been developed for use in vehicles, and briefcases and other carrying cases are conventionally used, the need has not been filled. Briefcases and other conventional carrying cases provide a convenient means for transporting articles to and from a vehicle, but become one more item to slide off the seat in a sudden stop, or to slide out of reach when the vehicle is driven around a corner, for no means are generally available to hold such cases in place. Further, writing tables and the like either are fixed in place, and thus may be inconveniently located, or are so portable as to present the problem discussed above; that is, they become one more loose object in the vehicle to endanger the driver and passengers.

SUMMARY OF THE INVENTION

It is, therefore, an object of the present invention to provide a combination storage file, briefcase and desk for use in vehicles which will overcome the problems of the prior art.

It is another object of the present invention to provide a storage file, and detachable briefcase and desk assembly which may be secured in a vehicle for convenient access and easy use by a driver or passenger of the vehicle.

It is a further object of the present invention to provide a vehicle storage assembly which incorporates an organizer file removably securable to a vehicle seat, and a desk assembly which is detachably securable to the organizer file, the desk assembly including a briefcase having a latchable cover and adapted to carry small articles, and including a flat upper surface adapted to serve as a desk surface.

In accordance with the present invention, a vehicle storage device is provided which includes an organizer file for holding papers and small articles combined with a briefcase-desk unit which is connected to the organizer but which may be detached for separate use. The storage device provides a place where loose equipment and papers may be secured and stored in a vehicle to provide better organization and safety, provides a convenient writing desk which may incorporate clip means for securing papers on the desk surface, and provides a strong lighweight briefcase which may be used to carry equipment and paperwork to and from the vehicle.

The organizer file portion of the storage device comprises a plurality of vertically disposed pockets of various sizes attached to a backing which, in turn, carries a pair of mounting brackets. These brackets are in the form of adjustable hooks or hangers which fit over the back of a vehicle seat to hold the file in position. The unit is constructed of a durable, heavy-duty material such as high impact Styrene, preferably with a leather grain texture for an attractive appearance. The pockets are designed to receive articles such as flashlights, clipboards, pencils, eyeglasses, and the like, as well as papers, folders, maps, magazines, and other sheet material. The pockets may be arranged in two horizontal rows across the backing, in one form of the invention, or may be in a single row in a modified form.

At the lower end of the organizer file portion of the storage device are located a pair of spaced, upwardly extending hooks, or clips, which receive corresponding brackets, or eyes, secured to the end of the briefcase-desk assembly portion of the storage device, whereby the briefcase may be detachably connected to the organizer file. The briefcase includes a base container having a hinged lockable cover which is hinged at one end of the unit, rather than along an edge as in conventional briefcases, to permit easy access when the unit is secured in place in a vehicle. The outer surface of the cover serves as a desk top, and incorporates a suitable clip to hold papers in place on it.

The bottom of the briefcase unit is formed with a depending ridge which forms a leg on which one end of the briefcase rests, the opposite end being held by the bracket means on the organizer file. The adjustable hangers for the organizer allow the height of the end of the desk unit to be adjusted, so that it can be leveled or tilted as desired for easy use. It is preferred that the briefcase-desk portion of the storage device be offset with respect to the organizer file portion so that the desk will be closer to one side of the organizer file and thus be convenient to a person, such as the driver of the vehicle, seated next to the storage unit.

The storage unit of the present invention may be provided with a number of accessories, such as a bracket for securing a high-intensity lamp to the briefcase to illuminate the desk surface. Also, if desired a microphone clip may be provided on the side of the briefcase to secure a radio microphone at a position that is convenient to the driver of the vehicle.

Thus, the present invention provides a storage unit which is easily installed in a vehicle by means of adjustable hangers on a file portion, the hangers fitting over the back of a seat, and which provides convenient, easy-to-reach storage for a variety of articles which normally cannot be carried in a glove compartment of a vehicle. The unit incorporates a detachable briefcase-desk assembly which not only provides storage, but a convenient table surface for use in the vehicle. The briefcase is securely held in position within the vehicle, being supported at one end by the file portion and at the other end by the cushion part of the vehicle seat, but is easily detachable from the file portion for separate use in the normal manner of a briefcase.

BRIEF DESCRIPTION OF THE DRAWINGS

The foregoing and additional objects, features and advantages of the invention will be more fully appreciated from a consideration of the following detailed description thereof, taken in conjunction with the accompanying drawings, in which.

DESCRIPTION OF PREFERRED EMBODIMENTS

Figure 1:
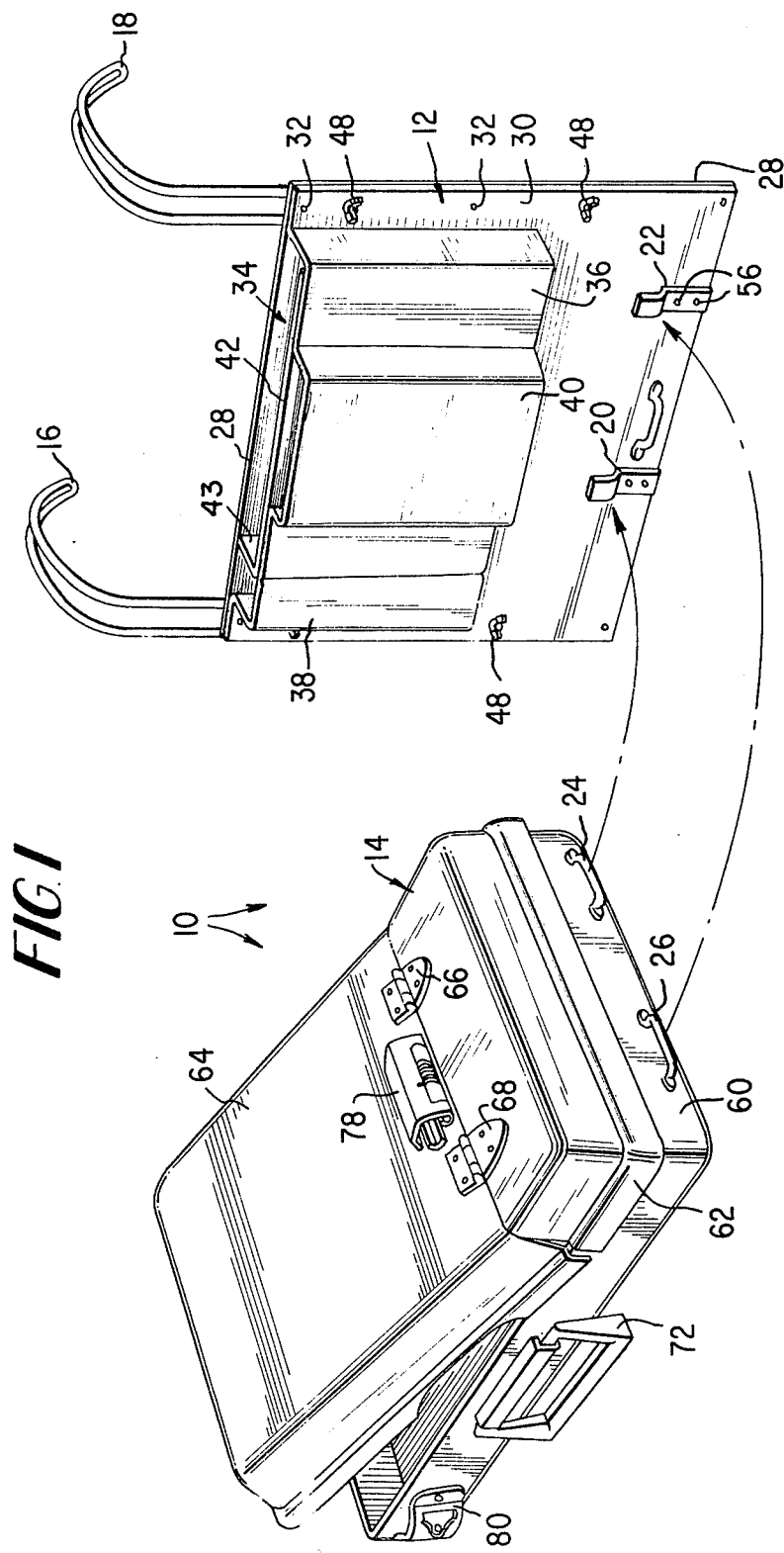
FIG. 1 is a partially exploded, perspective view of the storage unit of the present invention.
Figure 2:
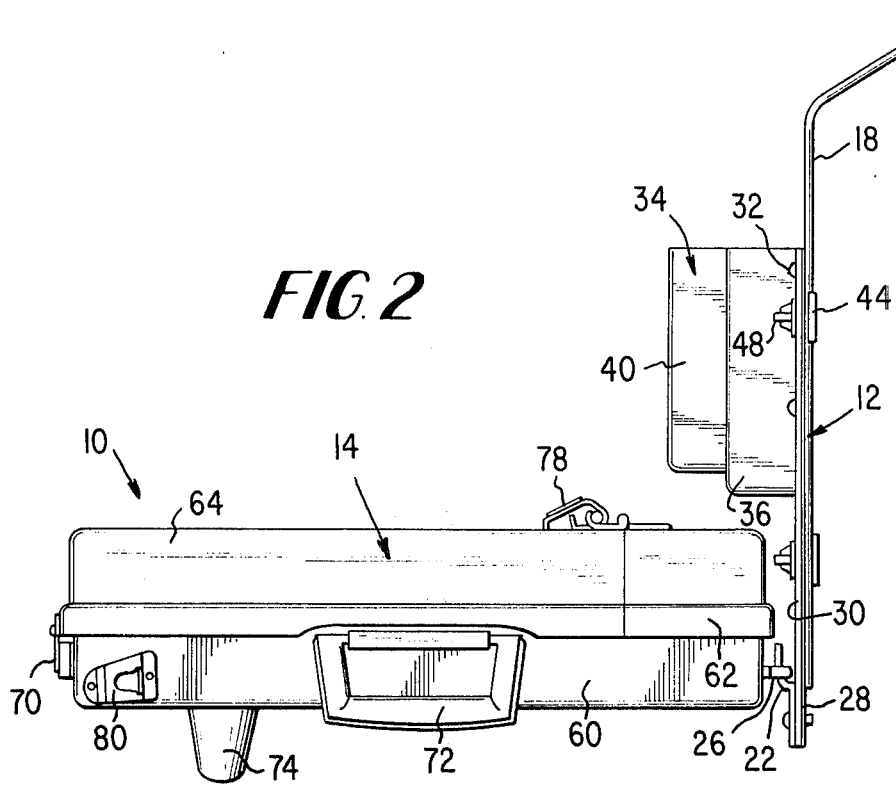
FIG. 2 is a side elevation of the storage unit of FIG. 1.
Figure 3:
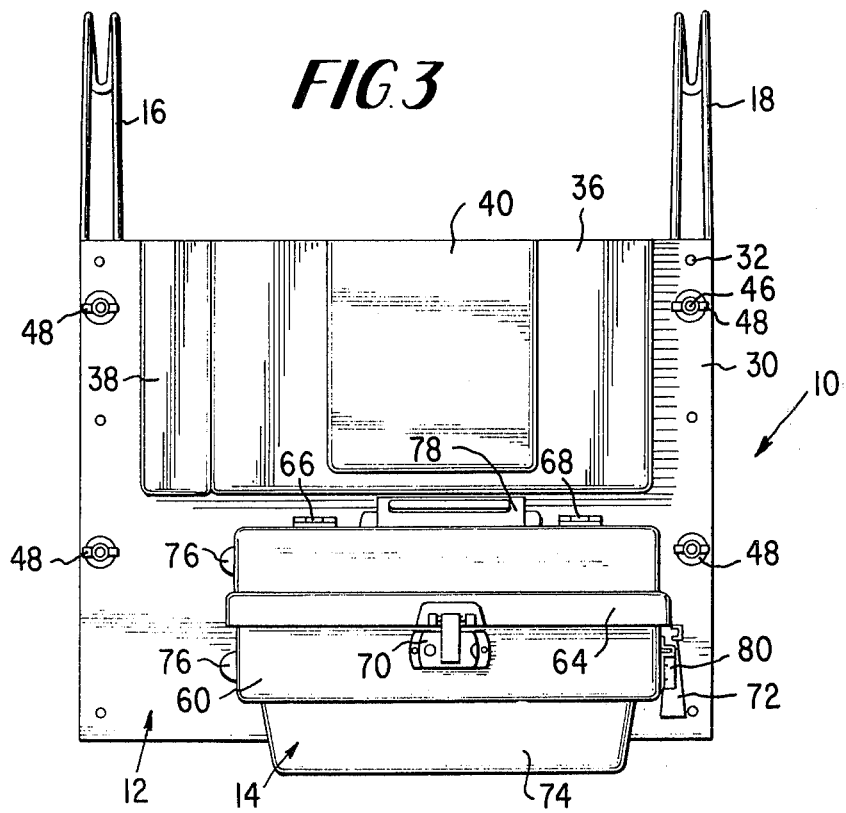
FIG. 3 is a front elevation of the storage unit of FIG. 1.

Turning now to a more detailed consideration of the present invention; reference is now made to FIGS. 1–3 of the accompanying drawings, wherein a preferred form of the storage unit is generally indicated at 10. The storage unit generally comprises an organizer file portion 12 and a detachable briefcase-desk portion 14, the file portion being adapted to be secured to a vehicle by means of hangers 16 and 18, and the briefcase portion being, in turn, secured to the file by means of clips 20, 22 and corresponding brackets 24, 26. Both the file portion 12 and the briefcase portion 14 preferably are molded from a high impact styrene or other suitable plastic material, the plastic being of a suitable color and, if desired, provided with a surface texture to simulate grain leather or other material.

The organizer file 12 comprises a backing 28, comprising a flat sheet of plastic, to which a molded cover sheet 30 of plastic is attached by means of fasteners such as rivets 32, adhesive, or the like. The cover sheet is shaped to form a plurality of vertically disposed, upwardly opening, pockets generally indicated at 34. The exact shape of the pockets may be varied, depending upon the particular use to which the organizer is put. Thus, some users may prefer a pocket arrangement designed primarily to receive magazines, maps, brochures, writing paper, and like sheet material, while others may prefer pockets shaped to receive a variety of articles such as flashlights, emergency equipment, sunglasses, pencils, and the like. In the present embodiment, the pocket arrangement 34 includes a wide pocket 36 extending across most of the width of backing 28, and adapted to receive papers, a clipboard, booklets and other large items. Adjacent pocket 36 the molded cover 30 is shaped to form a small pocket 38 adapted to receive elongated articles such as a flashlight. Both pocket 36 and pocket 38 are closed at the back by backing sheet 28, and are closed at their bottoms by a molded floor. The front of pocket 36 may incorporate another pocket portion 40 which is also molded into the cover 30 and is separated from pocket 36 by a plastic divider sheet 42. The divider sheet fits in the pocket portion 36 and is secured by a suitable fastener, such as an adhesive, to the cover 30. The left-hand end of divider 42, as viewed in FIG. 1, is L-shaped to provide a wall 43 which separates pockets 36 and 38.

The hangers 16 and 18 are adapted to hold the organizer file firmly in place in a vehicle, and for this purpose are illustrated as being curved to fit over the upright portion of a vehicle seat. The hangers are illustrated as being shaped metal rods or wires which are adjustably secured to the organizer by means of suitable clamps 44 fastened by bolts 46 and wing nuts 48 (see FIG. 4). Each clamp is formed with a pair of parallel grooves 50, 52 which engage the rods forming the hanger. The bolt 46 passes through a corresponding aperture 54 in the clamp, and through the backing sheet 28 and the front panel 30 to receive the wing nut 48. Tightening of the wing nut draws the clamp and the hanger tightly against the backing sheet 28, securing the hanger and further holding the sheets 28 and 32 together. When the wing nuts are loosened, the hangers can be moved up or down to adjust the height of the organizer file with respect to the vehicle seat to which it is secured.

Riveted or otherwise fastened to the organizer file, preferably at the bottom thereof as illustrated in FIGS. 1 and 2, are the pair of clips 22 to which the briefcase is attached. The clips may take many forms, but in the present embodiment comprise metal strips which each have a first end adapted to be mounted flush with the front sheet 30, with rivets 56 extending therethrough to secure them in place. The second end of each strip is bent outwardly from the sheet 30 to form an upwardly extending hook-like projection adapted to receive a corresponding fitting on the briefcase 14. As may be seen in FIG. 3, the clips 20 and 22 preferably are offset from the center of the file portion 12 so that the desk surface is more easily reached by a person sitting next to the storage unit. In the preferred embodiment, the briefcase-desk is offset to the right, as viewed in FIG. 3, this arrangement being particularly useful when the unit is placed for use by the driver of the vehicle.

The briefcase-desk unit 14 consists of a molded container base 60 having a fixed cover portion 62, secured to or formed as a part of the base 60, and a movable cover portion 64. The fixed cover portion extends across one end of the container preferably the end which is to be attached to the file 12. The movable cover portion 64 is fastened to the fixed portion 62 of the container by means of suitable hinges 66 and 68, the hinges being affixed to the cover portions 62 and 64, in the preferred embodiment, by means of rivets. As illustrated in the drawings, the cover is hinged to open at one end of the briefcase, rather than being hinged in the usual manner to open along one side thereof, thereby to facilitate access to the interior of the briefcase when it is attached to the file organizer.

A conventional lockable latch and keeper 70 is secured to the briefcase to hold the cover closed and to permit the briefcase to be locked. Conventional carrying means such as a handle 72 is secured to one side of the briefcase, preferably being affixed to the base portion 60. The brackets 24, 26 by which the briefcase is attached to the file organizer are fastened to one end of the base portion 60, as by means of rivets or other suitable fasteners, these brackets being sized and spaced to engage the upstanding hooks 20 and 22, respectively. The two brackets, which are located at the end of the briefcase opposite the latch 70, are spaced below the cover portion 62, are preferably of metal, and are shaped to form elongated slots, eyes, or other configurations suitable for engagement with the hooks.

At or near the free end of the briefcase-desk portion of the storage unit, that is, near the end of the briefcase opposite to its attachment to the file organizer, is a support leg 74 which may be molded as a part of the container base 60, or may be a separate unit attached to the base. This leg provides a stand for the briefcase when it is attached to file portion 12, allowing the briefcase to rest, for example, on the seat of the vehicle. This leg, combined with the adjustability of the hangers 16 and 18 allows the briefcase to be held in a level or near-level position for use as a desk. When the briefcase is detached from the file 12, it may rest on feet 76 formed in the base and cover portions on the side of the briefcase opposite handle 72.

The top surface of cover 64 on the briefcase is flat and may be provided with a conventional spring-biased clip 78 which is adapted to receive and hold papers and other sheet material. The clip allows the top of the briefcase to serve as a clipboard, holding writing material, forms, brochures, and the like at a location and position convenient to a person riding in the vehicle. The size of the briefcase and the height of leg 74, together with the adjustability of the hangers 16 and 18 permit the top of the briefcase to be adjusted to a writing level and angle that will facilitate use by a person sitting next to the unit.

When the storage unit is assembled, as illustrated in FIGS. 2 and 3, it serves as a combination file, briefcase and desk, the file portion serving to hold materials that normally would be left in the vehicle, and the briefcase serving to carry materials which the user might wish to remove from the vehicle from time to time. The hinged cover allows easy access to the interior of the briefcase, the cover being hinged in such a location that the cover can be opened fully without striking the pockets 34. The connection between the briefcase and the file secures the two together so as to prevent the briefcase from sliding around in the vehicle, keeping it within convenient reach of the user, while allowing it to be easily detached when it is to be removed from the vehicle.

As accessories to the storage unit there may be provided a microphone clip 80 secured to the side of the base portion 60 of the briefcase. This clip provides a convenient, easy-to-reach mounting for the microphone of a short wave radio transmitter, a particularly useful feature when the storage unit is installed in a police car or other emergency vehicle. If desired, a second clip, or bracket, (not shown) may be provided on the base 60 to receive a small high-intensity lamp for illuminating the desk surface of the briefcase. Such a lamp may, for example, be of the type that plugs into a vehicle cigarette lighter.

Figure 5:
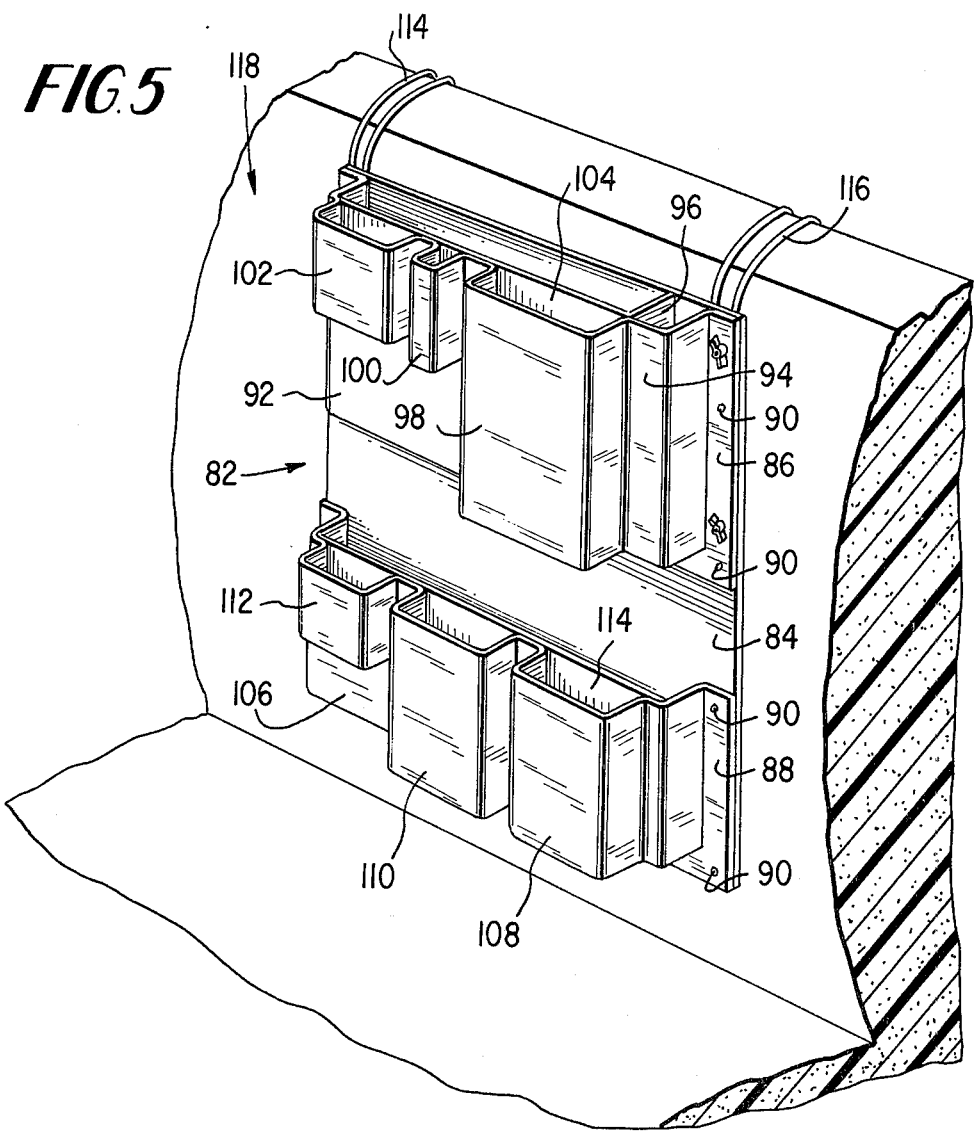
FIG. 5 is a perspective view of a modified form of the invention.

A modified version of the file organizer portion of the storage unit of the present invention is illustrated in a perspective view in FIG. 5, to which reference is now made. The organizer, generally indicated at 82 is constructed in a manner similar to that of the organizer of FIGS. 1–3, and thus includes a backing panel 84 to which molded front pocket panels 86 and 88 are secured, as by means of rivets 90 or other suitable fasteners. As in the first embodiment discussed above, each front pocket panel is shaped to define a plurality of vertical, upwardly opening pockets which are adapted to receive a variety of articles. Pocket dividers of the type illustrated in FIG. 1 may be provided to separate the pockets into individual sections, as desired, with the backing sheet 84 serving to close the backs of the pockets. In this embodiment of the invention, two vertically spaced, front panels are secured to the backing to produce an organizer file having two rows of pockets. The upper front panel 86 includes a wide pocket portion 92 adapted to receive relatively large, flat articles, such as magazines, brochures, and clipboards. Also included is a narrow pocket portion 94 which is separated from portion 92 by an interior divider wall 96, and is adapted to receive elongated items such as flashlights. Arranged across the front of the pocket portion 92, and molded as a part of panel 86, are three smaller pocket portions 98, 100, and 102, all of which are separated from each other by molded walls and separated from pocket portion 92 by a divider wall 104 secured to the interior of panel 86.

It will be noted that the file 82 as thus far described is similar to the file portion 12 of FIGS. 1–3; however, the remainder of the file differs in that the lower pocket panel 88 is provided in the place of the clips 20 and 22 of the first embodiment. The lower pocket panel is molded to define a wide rear pocket portion 106 and three smaller, forward pocket portions 108, 110, and 112. A divider panel 114 secured to the inside of panel 88 divides the forward pockets from the rear pocket, while the backing panel 84 closes the back of pocket 106. It will be noted that the pockets of panel 88 may be shallower than those of panel 86, and thus may be adapted to receive file folders, maps, and other smaller papers. However, it will be understood that numerous variations in the size, configuration, and number of pockets may be made.

Figure 4:
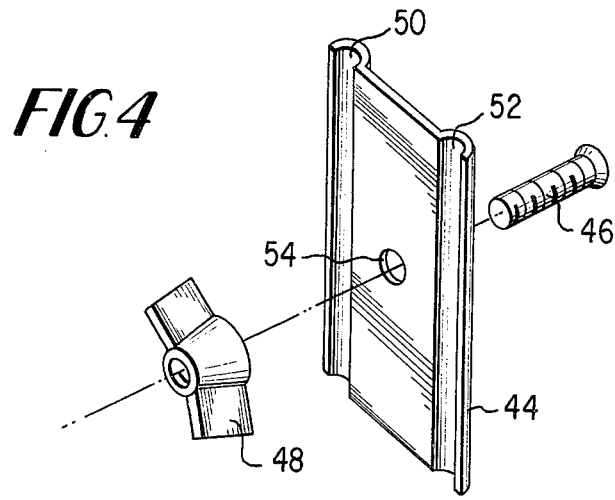
FIG. 4 is an exploded view of a fastener used with the storage unit of FIG. 1.

The organizer file 82 is provided with a pair of hangers 114 and 116 which are adjustably attached thereto by means of clamps of the type illustrated in FIG. 4, the clamps having bolts passing through the backing sheet and the upper pocket panel 86 and secured by wing nuts. The hangers are adapted to engage the back of a vehicle seat, as diagrammatically illustrated at 118 in FIG. 5.

If desired, the organizer file 82 may be provided with a pair of clips of the type illustrated at 20, 22 in FIGS. 1–3, by means of which a carrying case, or briefcase-desk unit, may be attached. The clips (not shown) may be located on the face of the pockets 108, 110, or may be otherwise located as desired.

Figure 6:
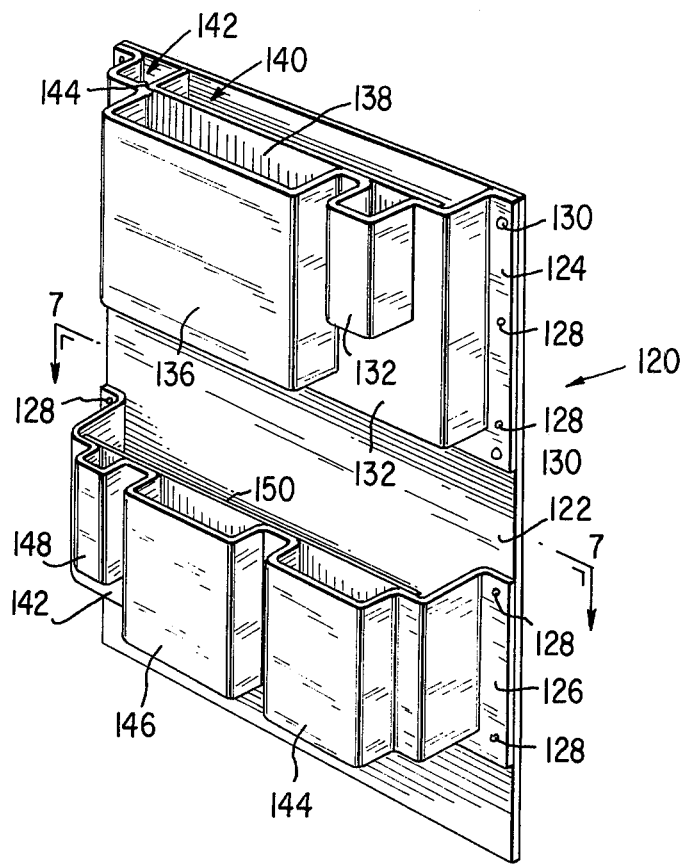
FIG. 6 is a perspective view of another form of the invention.
Figure 7:
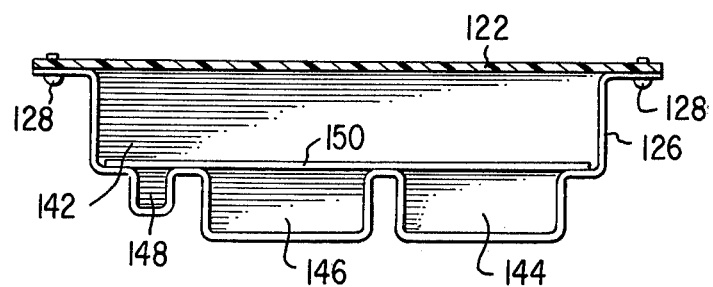
FIG. 7 is a cross-sectional view of the device of FIG. 6, taken along line 7—7 and illustrating the construction of the storage device.

FIGS. 6 and 7 illustrate a further embodiment of the invention, showing a modified form of the file organizer of FIG. 5. The organizer indicated generally at 120 comprises a backing sheet 122 and upper and lower front pocket panels 124 and 126 secured thereto by rivets 128. Apertures 130 passing through the backing sheet and the upper panel 124 are adapted to receive bolts or other fasteners for securing suitable hangers or brackets (not shown) to the organizer for securing it in a vehicle or to a suitable surface in a substantially vertical position.

The upper pocket panel is shaped to form a main pocket 132 and, in this embodiment, two front pockets 134 and 136. A divider panel 128 separates the front and rear pockets, and divides the rear pocket into two sections 140 and 142. It will be noted that the pocket panel 124 is formed with an indentation, or shoulder, 144 which serves to position the divider wall 138 within the panel. The divider may be secured in place by suitable fasteners such as adhesives, rivets, or the like.

The lower panel, illustrated in the sectional view of FIG. 7 as well as in perspective in FIG. 6, again illustrates the manner in which the pocket panel is molded to form pockets of desired configuration, and in which the backing panel forms the back of the pocket. Thus, the pocket panel 126 is shaped to form a rear pocket 142 and three front pockets 144, 146 and 148. A divider panel 150 which separates the front pockets from the rear pocket, is secured, as by a suitable adhesive, to the interior of the panel.

Again, although not illustrated in FIGS. 6 and 7, the organizer file 120 may be provided with suitable clips for use in securing a briefcase to the face of the file, in the manner illustrated in FIGS. 1–3.

Thus, there has been illustrated and described a new and unique storage unit that is particularly adapted for use in automobiles, police cars, delivery and emergency vehicles, and the like, providing safe and convenient storage and desk facilities within the vehicle and providing convenient means for transporting articles to and from the vehicle. Although the invention has been described in terms of preferred embodiments thereof, numerous modifications and variations will become apparent to those skilled in the art. Thus, as has already been noted, the exact arrangement of storage pockets in the organizer file may be varied to suit the needs of various users. Some may desire less storage area for papers and a greater number of pockets to accommodate small articles, while others may need additional paper storage capacity. The hooks and brackets shown for securing the briefcase-desk to the file may be varied in any desired way; for example, the hook means may be placed on the briefcase and the brackets on the file. The direction of opening the lid, or cover, on the briefcase may be modified, with resultant relocation of the hinges, if desired, and the exact shape or size of the briefcase may be modified. The manner in which the file portion is secured to the vehicle may be modified, although the seat hangers are preferred. These and other changes are within the skill of the art, and accordingly it is desired that the present invention be limited only by the following claims.

What is claimed is:

1. A storage unit, comprising:
   an organizer file having a plurality of pockets;
   means for securing said file in a substantially vertical position;
   a briefcase-desk unit including a container base, a hinged, openable and closable cover, and latch means for holding said cover closed; and
   means for detachably securing said briefcase-desk unit to the face of said organizer file whereby said briefcase-desk unit serves as a desk when secured to said organizer file and as a briefcase when detached therefrom.

2. The storage unit of claim 1, wherein said organizer file comprises a backing member and a shaped front-panel member secured thereto, said members cooperating to form said pockets.

3. The storage unit of claim 1, wherein said cover includes clip means for securing sheet material on the outside surface of said cover, whereby said cover serves as a desk unit.

4. The storage unit of claim 3, wherein said briefcase-desk unit incorporates a support leg, said support leg and said organizer file cooperating, when said briefcase-desk unit is secured to said file, to support said briefcase-desk unit in a substantially horizontal position.

5. The storage unit of claim 4, wherein said means for securing said file in a substantially vertical position comprises adjustable hanger means attached to said backing member.

6. The storage unit of claim 1 wherein said means for securing said file in a substantially vertical position comprises adjustable hanger means attachable to said backing member.

7. The storage unit of claim 6, wherein said means for detachably securing said carrying case to said organizer file comprises clip means connected to one of said carrying case and organizer file, and corresponding bracket means for engaging said clip means connected to the other of said carrying case and organizer file.

8. A storage unit for use in automatove vehicles, comprising:
   an organizer file having a backing sheet and a shaped pocket panel secured thereto, said pocket panel being formed to define a plurality of article and sheet-receiving pockets on the face of said backing sheet;
   adjustable support means for securing said organizer file in a vehicle;
   a carrying case comprising a briefcase-desk unit having a base and an openable cover, said cover being hinged so that said briefcase opens at the free end thereof, said cover forming a desk top; and
   clip and bracket means secured to said carrying case and the face of said organizer file for detachably connecting said carrying case to said vehicle.

9. The storage unit of claim 8, further including a second shaped pocket panel secured to said backing member, said second pocket panel being formed to define a second plurality of article and sheet-receiving pockets on the face of said backing sheet.

10. The storage unit of claim 9, further including divider panels secured to at least one of said pocket panels, said divider panels cooperating with said backing member and said at least one pocket panel to define selected ones of said pockets.

11. The storage unit of claim 8, further including a divider panel secured to said pocket panel and cooperating with said backing member and said pocket panel to define selected ones of said pockets.

12. The storage unit of claim 8, wherein said carrying case includes a support leg for supporting the free end of said carrying case when said case is connected to said organizer file, said adjustable support means and said support leg cooperating to maintain said carrying case in a substantially horizontal position, so that the top of said carrying case forms a desk top.

13. The storage unit of claim 12, wherein the portion of said clip and bracket means which is secured to the face of said organizer file is off-center with respect to said file, whereby said desk top is adjacent an edge of said organizer file to facilitate access to said desk top.

14. The storage unit of claim 8, further including a second shaped pocket panel secured to said backing member, said second pocket panel being formed to define a second plurality of article and sheet-receiving pockets on the face of said backing sheet.

15. The storage unit of claim 14, further including divider panels secured to at least one of said pocket panels, said divider panels cooperating with said backing member and said at least one pocket panel to define selected ones of said pockets.

16. The storage unit of claim 8, further including a divider panel secured to said pocket panel and cooperating with said backing member and said pocket panel to define selected ones of said pockets.

* * * * *